US 8,467,509 B2

(12) United States Patent
Oya (10) Patent No.: US 8,467,509 B2
(45) Date of Patent: Jun. 18, 2013

(54) VIDEO DISPLAYING APPARATUS, VIDEO DISPLAYING SYSTEM AND VIDEO DISPLAYING METHOD

(75) Inventor: Takashi Oya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 768 days.

(21) Appl. No.: 12/562,530

(22) Filed: Sep. 18, 2009

(65) Prior Publication Data

US 2010/0079675 A1   Apr. 1, 2010

(30) Foreign Application Priority Data

Sep. 30, 2008   (JP) .................................. 2008-255575

(51) Int. Cl.
*H04M 11/00* (2006.01)

(52) U.S. Cl.
USPC ..................................... 379/93.21; 348/14.07

(58) Field of Classification Search
USPC .......... 348/14.01, 14.07, 14.08, 14.16, 14.03; 379/93.17
See application file for complete search history.

(56) References Cited

U.S. PATENT DOCUMENTS

| | | | | |
|---|---|---|---|---|
| 5,915,091 A | * | 6/1999 | Ludwig et al. | 709/204 |
| 6,008,809 A | * | 12/1999 | Brooks | 715/792 |
| 6,961,446 B2 | | 11/2005 | Imagawa et al. | |
| 7,058,689 B2 | * | 6/2006 | Parker et al. | 709/206 |
| 8,120,638 B2 | * | 2/2012 | Kenoyer | 348/14.08 |
| 2002/0031262 A1 | | 3/2002 | Imagawa et al. | |
| 2004/0189710 A1 | * | 9/2004 | Goulden et al. | 345/790 |
| 2008/0307324 A1 | * | 12/2008 | Westen et al. | 715/753 |

FOREIGN PATENT DOCUMENTS

| | | |
|---|---|---|
| JP | 8-79721 | 3/1996 |
| JP | 2849119 B2 | 1/1999 |
| JP | 2000-099691 A | 4/2000 |
| JP | 2002-176619 A | 6/2002 |
| JP | 2004-72310 | 3/2004 |

* cited by examiner

*Primary Examiner* — Olisa Anwah
(74) *Attorney, Agent, or Firm* — Fitzpatrick, Cella, Harper & Scinto

(57) ABSTRACT

An image processing apparatus includes a video displaying apparatus which composites information including at least one of a graphic and a text to a video and displays the composite video. The video displaying apparatus comprises a display processing unit configured to display a person area of a person included in the video and an area of the information including at least one of the graphic and the text so that the person area and the area of the information do not overlap.

20 Claims, 7 Drawing Sheets

VIDEO DISPLAYING APPARATUS, VIDEO DISPLAYING SYSTEM AND VIDEO DISPLAYING METHOD

BACKGROUND OF THE INVENTION

1. Field of the Invention

The present invention relates to a video displaying apparatus, a video displaying system and a video displaying method which composite plural videos including persons and display an obtained composite video, a program which is used by a computer to perform the video displaying method, and a recording medium which stores therein the program.

2. Description of the Related Art

In recent years, in TV (television) broadcast and video conferences, a technique of compositing (or synthesizing) plural live videos, a live video and a text, a live video and a graphic, or the like has been widely used. As the technique like this, there is a technique of compositing videos at plural points based on screen separation, a picture-in-picture compositing technique, a chroma key compositing technique, or the like.

For example, Japanese Patent Application Laid-Open No. H08-079721 discloses a technique of displaying, in a video conference, a person video and a document video respectively on screens divided into two. Further, for example, Japanese Patent No. 2849119 discloses a technique of arranging, in a TV telephone system to be used between two points, talkers on a common background, and also discloses a technique of displaying a video of a communication partner on a stored background image in a picture-in-picture form. Furthermore, for example, Japanese Patent Application Laid-Open No. 2004-072310 discloses a technique of arranging a graphic such as a dialogue balloon and the like or a text around a displayed person.

However, in the chroma key compositing technique of extracting the person from the live video and compositing the extracted person to another background video, a background area is obtained by detecting a specific color (chroma). For this reason, in a case where a document (a text) or the like is displayed on the background, if the document is displayed wholly on the background, there is a case in which the important portion of the displayed document is hidden by the person which is displayed on the foreground. Further, since the chroma key compositing technique is the technique of mechanically substituting another video for the background, this is not suitable for the purpose of disposing the document or the text on the background in consideration of the position and the border of the foreground.

On the other hand, there is a method of dividing a screen into plural screens and then separately displaying a person video and a document video respectively on different screens divided. However, in this method, since each of the person video and the document video is displayed on the divided screen having a predetermined shape, the overall screen is not necessarily used effectively. Further, there is a technique of extracting a person area and disposing a figure and a text on the background of the person area. However, in this technique, if a document includes a lot of contents, there is a case where the whole of the figure and the text cannot be displayed because a free space is narrow.

SUMMARY OF THE INVENTION

The present invention, which has been completed in consideration of such problems as described above, aims to improve, in case of compositing plural contents and displaying the composited contents, visibility of the plural contents such as a video content including a person and the like.

To achieve such an object, an image processing apparatus according to the present invention is equipped with the following constitution. Namely, the image processing apparatus includes a video displaying apparatus which composites information including at least one of a graphic and a text to a video and displays the composite video, wherein the video displaying apparatus comprises a display processing unit configured to display a person area of a person included in the video and an area of the information including at least one of the graphic and the text so that the person area and the area of the information do not overlap.

According to the present invention, in case of compositing plural contents including at least one of a video, a graphic and a text and then displaying the composited contents, it is possible to improve visibility of the plural contents such as the video contents including a person and the like.

Further features of the present invention will become apparent from the flowing description of the exemplary embodiments with reference to the attached drawings.

DESCRIPTION OF THE EMBODIMENTS

First Embodiment

In the first embodiment of the present invention, in a compositing display method of compositing and displaying a background area of a person and contents (information) such as a document (text), a graphic and the like in such a manner as the contents are arranged on the background area of the person, a method in which visibility of both the person and the contents is excellent will be described. Incidentally, in case of compositing a person area and a content area in the above compositing display method, the border area of the person is first measured and then the person area and the content area are arranged so that these areas do not overlap. At this time, panning, tilting and zooming of a camera are controlled to set a wide background area so that the person area is arranged at a desired position.

Figure 1:
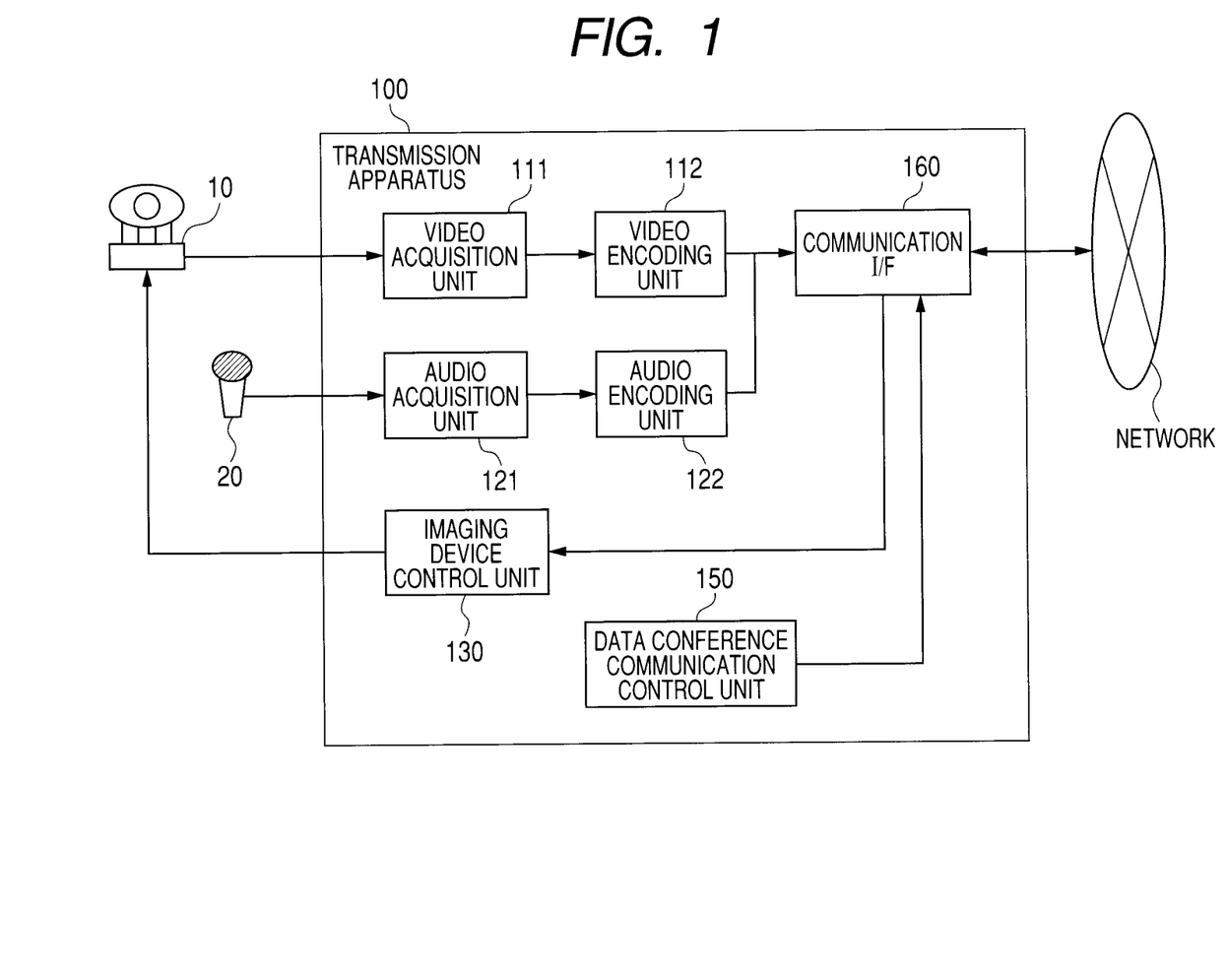
FIG. 1 is a block diagram illustrating an example of the functional constitution of a transmission apparatus.
Figure 2:
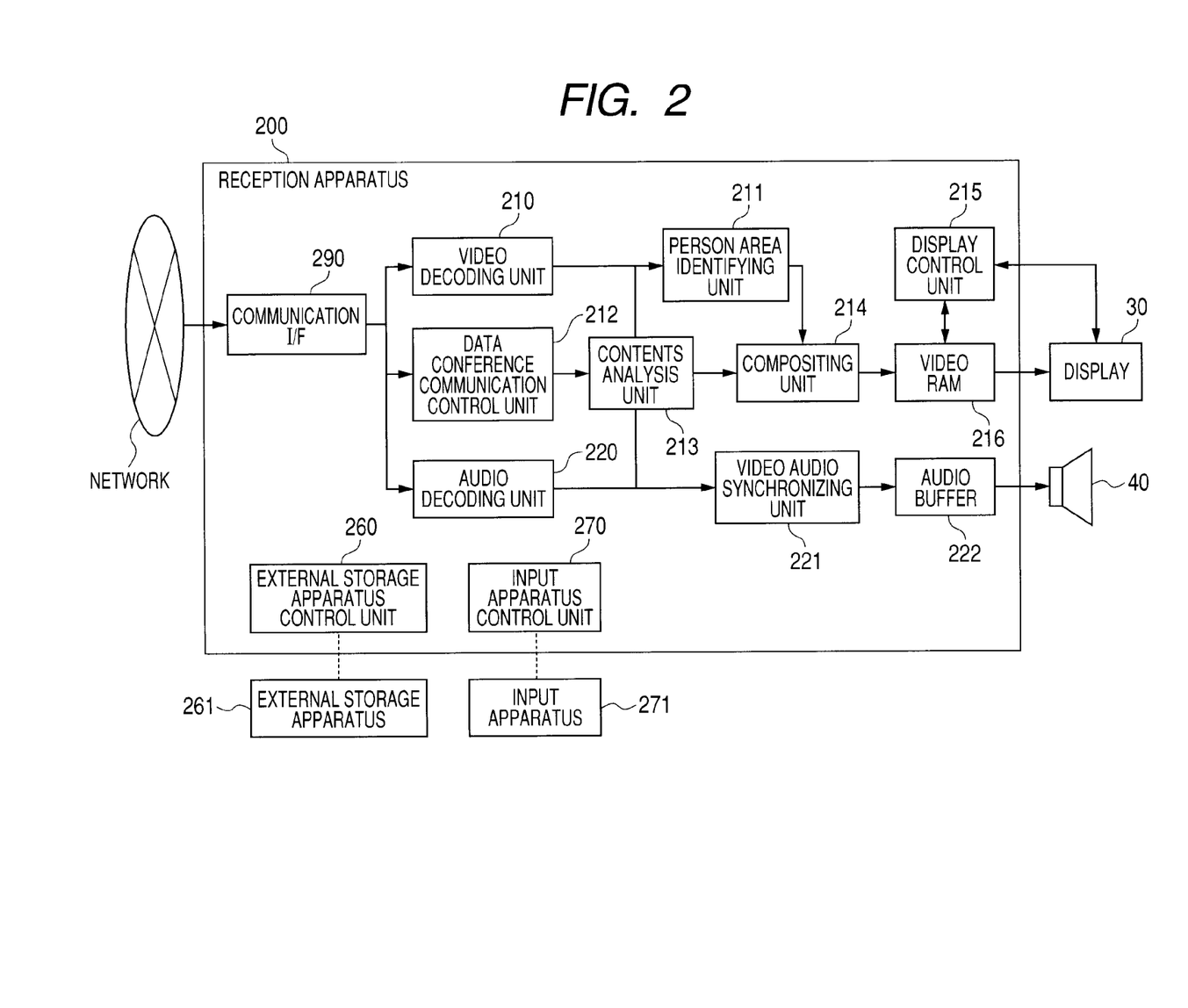
FIG. 2 is a block diagram illustrating an example of the functional constitution of a reception apparatus.

FIGS. 1 and 2 are block diagrams illustrating the functional constitutions (partially including the hardware constitutions) of the terminal apparatuses which constitute a video displaying system according to the first embodiment of the present invention. Incidentally, it should be noted that FIGS. 1 and 2 merely illustrate only the portions which concern the description of the present embodiment. Further, it should be noted that, in the present embodiment, a video conference (that is, a TV conference) will be described as an intended use of the video displaying system.

The video displaying system in the present embodiment is constituted by including a transmission apparatus 100 and a reception apparatus 200. Under normal conditions, the video conference is performed by using the transmission apparatus 100 and the reception apparatus 200.

In the first instance, it should be noted that the transmission apparatus 100 illustrated in FIG. 1 acquires video and audio, and then transmits the acquired video and the acquired audio. An imaging device (i.e., a camera) 10 and a microphone 20 are connected to the transmission apparatus 100. Incidentally, the camera 10 and the transmission apparatus 100 may be constituted integrally.

The transmission apparatus 100 is constituted by including a video acquisition unit 111, a video encoding unit 112, an audio acquisition unit 121, an audio encoding unit 122, an imaging device control unit 130, a data conference communication control unit 150, and a communication I/F (interface) 160.

The video acquisition unit 111 acquires the video generated by the camera 10 to generate video information, and the video encoding unit 112 encodes the video information input from the video acquisition unit 111. Here, in the video encoding unit 112, the video information may be encoded in a Motion JPEG (Joint Photographic Experts Group) form, an MPEG-2 (Moving Picture Experts Group-2) form, an H.264 form, or the like. However, it should be noted that the image encoding form in the present embodiment is not limited to a specific encoding form.

Further, the audio acquisition unit 121 acquires the audio collected by the microphone 20 to generate audio information, and the audio encoding unit 122 encodes the audio information acquired by the audio acquisition unit 121. Here, in the audio encoding unit 122, the audio information may be encoded in a G.711 form, a G.722 form, or the like. However, it should be noted that the audio encoding form in the present embodiment is not limited to a specific encoding form. In any case, the encoded audio information and the encoded video information are transmitted to a terminal of a communication partner by the communication I/F 160 through a network such as the Internet or the like.

The camera 10 can be controlled from the terminal of the communication partner so as to be panned, tilted and zoomed in/out. That is, the transmission apparatus 100 receives a control instruction from the terminal of the communication partner through the communication I/F 160, and the imaging device control unit 130 actually controls the camera 10 by interpreting the received control instruction. Incidentally, in the video conference, various data such as document data, image data and the like are shared by the own terminal and the terminal of the communication partner. In other words, for example, the image which is the same as that displayed on the own terminal is also displayed on the terminal of the communication partner by using a shared white board function or the like. The data conference communication control unit 150 performs such control for sharing the image data, the document data and the like. Incidentally, a data sharing protocol T.120 is used in this case. Moreover, the data to be displayed on the own terminal need not necessarily be acquired from the terminal of the communication partner. That is, for example, the data existing in the reception apparatus 200 may be displayed. Besides, various setting information and messages may be displayed.

Subsequently, the reception apparatus 200 which receives the video information (data), the audio information (data) and the like transmitted from the transmission apparatus 100 will be described with reference to FIG. 2. Here, it should be noted that the reception apparatus 200 functions as a video displaying apparatus which composites plural contents including at least one of a video, a graphic (image) and a text (document) and displays the composited contents.

A displaying apparatus (i.e., a display) 30, a speaker 40, an external input apparatus 271 such as a remote controller, a mouse and/or a keyboard, and an external storage apparatus 261 are connected to the reception apparatus 200. Here, the display 30 and the reception apparatus 200 may be constituted integrally. Further, the reception apparatus 200 itself includes a video decoding unit 210, a person area identifying unit 211, a data conference communication control unit 212, a contents analysis unit 213, and a compositing unit 214. In addition, the reception apparatus 200 is constituted by including a video RAM (random access memory) 216, a display control unit 215, an audio decoding unit 220, a video audio synchronizing unit 221, an audio buffer 222, a communication I/F 290, an external storage apparatus control unit 260, and an input apparatus control unit 270.

The reception apparatus 200 receives various data such as the video data, the audio data, the document data and the like transmitted from the transmission apparatus 100 through the communication I/F 290. Then, the reception apparatus 200, which received the respective data, performs the decoding respectively according to kinds of received data. For example, the video data indicating video contents is decoded by the video decoding unit 210, and then a person area is extracted and identified from the decoded video data by the person area identifying unit 211. Here, as a method of extracting the person area, a method of detecting the face of a person and a method of detecting the upper body of a person are conceivable. In any case, the details of such detecting methods will be described later.

On the other hand, the document data indicating document (text) contents, still image contents and the like are decoded by the data conference communication control unit 212. After then, the contents analysis unit 213 analyzes the document content indicated by the decoded document data. For example, if the document data indicating the document contents is decoded, the contents analysis unit 213 analyzes the font size, the layout and the like constituting the document. After then, the compositing unit 214 determines the arrangement of the video including the person and the document, and actually composites the video and the document to generate one video (also called a composite video). Here, concrete layout and compositing methods will be described later. After then, the generated composite video is stored in the video RAM 216. Subsequently, the display control unit 215 displays the composite video stored in the video RAM 216 on the display 30. Incidentally, the display control unit 215 controls display timing at the time of displaying the composite video on the display 30. Besides, the audio data indicating the audio contents is decoded by the audio decoding unit 220. Further, reproducing timing between the video content and the audio content is adjusted by the video audio synchronizing unit 221, and thus the audio content is reproduced by the speaker 40 through the audio buffer 222. The external storage apparatus control unit 260 controls reading/writing of the data from/to the external storage apparatus 261 such as a hard disk or the like. Further, the input apparatus control unit 270 controls a data input operation to be performed by a user through the input apparatus 271.

Incidentally, each of the transmission apparatus 100 and the reception apparatus 200 is constituted by a CPU (central processing unit), a ROM (read only memory), a RAM (random access memory), a bus and the like all not illustrated. The function of each of the transmission apparatus 100 illustrated in FIG. 1 and the reception apparatus 200 illustrated in FIG. 2 is achieved if the CPU provided in each apparatus executes programs stored in the ROM, the external storage apparatus 261 (FIG. 2) and the like. Incidentally, it should be noted that each of the transmission apparatus 100 and the reception apparatus 200 can be constituted by, for example, a PC (personal computer) and/or an integrally provided board. For example, the video encoding unit 112, the audio encoding unit 122, the video decoding unit 210 and the audio decoding unit 220 can be achieved by using dedicated codec chips respectively. Likewise, the person area identifying unit 211 can be achieved by using a dedicated image processing chip.

Subsequently, an example of the compositing method according to the present embodiment of compositing the content of the video including the person and the content including the text will be described with reference to FIGS. 3 and 4.

Figure 3:
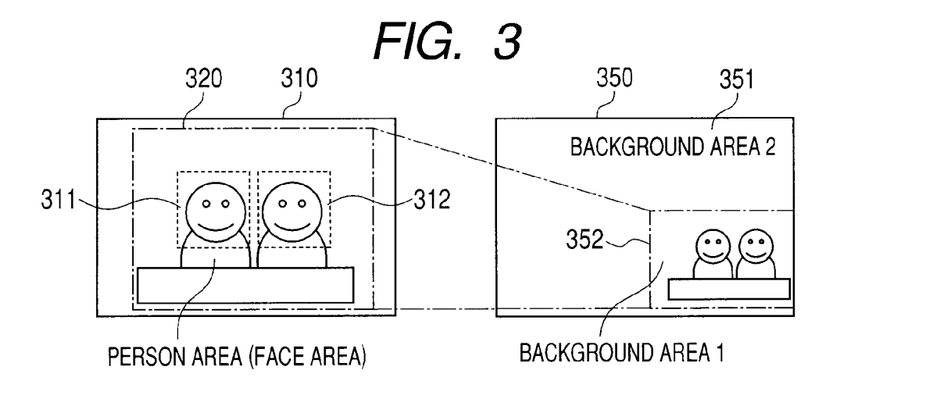
FIG. 3 is a diagram for describing a method of calculating, based on an original video, a position to which a person area is to be arranged.
Figure 4:
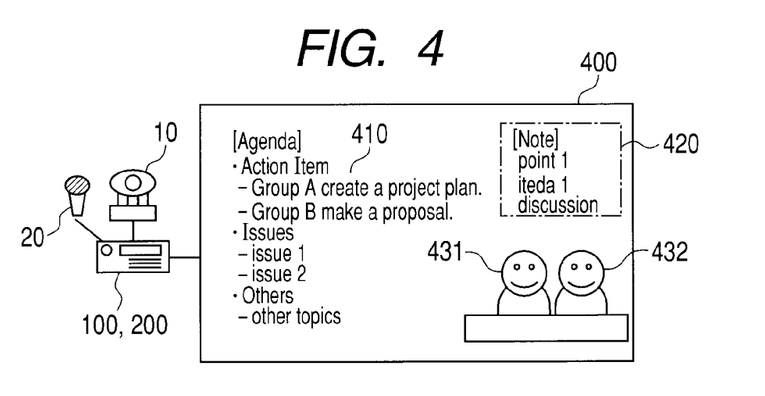
FIG. 4 is a diagram illustrating an example of a screen which is to be displayed by compositing a video including persons and document (text) contents.

In the first instance, it should be noted that FIG. 3 is the diagram for describing the method of changing the arrangement of the person area in a video 310 of the camera 10 which shot the persons. In other words, the video 310 illustrated in FIG. 3 is the original video which was shot by the camera 10. Moreover, in FIG. 3, a screen 350 is equivalent to the video which is acquired after the arrangement of the person area was changed.

In the video 310, since the persons are arranged at the center thereof, the area to which the document is arranged on the background area of the persons is small. For this reason, the arrangement as illustrated in FIG. 4 is produced according to one of two methods described as first and second methods in the following. That is, FIG. 4 is the diagram illustrating an example of the arrangement of the respective contents. More specifically, a screen 400 is equivalent to the displaying area of the display 30. In the screen 400, persons 431 and 432 are arranged at the lower right in the displaying range, and plural document contents 410 and 420 are arranged on the background area (this background area corresponds to an area (background area 2) 351 illustrated in FIG. 3) of the persons 431 and 432. Further, in the screen 400 of FIG. 4, the person area and the area of the document contents are arranged so that these areas do not overlap. Incidentally, although the document contents 410 and 420 are arranged in FIG. 4, for example, an image (graphic) content, a video content or the like may be arranged instead.

Here, the first method is the method of changing the position and the size of the person area by an image process. That is, an area 320 surrounding the persons illustrated in FIG. 3, that is, the area 320 including person areas (face areas) 311 and 312, is cut out, and the cut-out area 320 is electronically enlarged, reduced and moved parallelly. Here, it should be noted that such processes correspond to an example of the operation of an area changing unit. Then, in the screen 350 of FIG. 3, an area (background area 1) 352 is arranged so as to include the person areas at a newly set position in regard to the displaying area. On the other hand, the second method is the method of changing the position and the size of the person area by controlling the camera. That is, in the second method, any one of the panning, the tilting and the zooming of the camera 10 is controlled. Here, it should be noted that such a process corresponds to an example of the operation of an imaging device control unit. In any case, the persons are arranged at the position of the area 352 in the screen 350. Incidentally, in both the first method and the second method, the person area is identified by detecting the face or the upper body of the person. Such a detection process is to detect the features of an eye portion, an eyebrow portion, a nose portion, a mouse portion, a shoulder portion and/or the like from the image, and thus identify the position where the person exists on the basis of the detected features. It should be noted that the function for achieving the above detection process has already been installed in, for example, a commonly used digital camera or the like.

Subsequently, a difference between the first method and the second method will be described.

First, in the first method, the background area 1 illustrated in FIG. 3 is a real video, but the background area 2 is not a real video. On the other hand, in the second method, a real video can be used for both the background area 1 and the background area 2. For this reason, in the second method, for example, in a case where the document contents 410 and 420 illustrated in FIG. 4 are arranged and the documents are transparently displayed, it is possible to generate a natural composite video.

In addition, in the first method, the enlargement process, the reduction process and the parallel movement process of the camera are necessary for each frame. On the other hand, in the second method, a process for each frame is not necessary. However, in the second method, since it is necessary to control the camera 10, the video as displayed in the screen 350 is transmitted to a terminal to which shared displaying is not desired. In addition, if the system has the constitution that a control right is necessary in case of controlling the camera 10, there is a case where the control right cannot be acquired. In such a case, the first method is adopted.

Subsequently, a camera controlling amount in the second method will be described.

In FIG. 3, it is assumed that the person size before the controlling is H0 and the person size after the controlling is H1. Further, it is assumed that the person position before the movement is (x0, y0) and the person position after the movement is (x1, y1). Furthermore, it is assumed that the panning magnification, the tilting magnification and the zooming magnification before the controlling are (P0, T0, Z0) and the panning magnification, the tilting magnification and the zooming magnification after the controlling are (P1, T1, Z1). Here, the approximate values of P1, T1 and Z1 are calculated by the following equations (equation 1).

$$P1 = P0 + \tan^{-1}(x1/Z1/F) - \tan^{-1}(x0/Z0/F)$$

$$T1 = T0 + \tan^{-1}(y1/Z1/F) - \tan^{-1}(y0/Z0/F)$$

$$Z1 = Z0 \times H1/H0$$

Here, F is the focal length (pixel) at the time that the magnification is 1. In regard to the position (x, y) of the person, the middle of the screen is assumed as the center, the right direction on the drawing is assumed as the positive direction of the x axis, and the upper direction on the drawing is assumed as the positive direction of the y axis. Further, in a case where the camera is viewed from the transverse side, the rotation toward the upper direction is assumed as the positive direction of tilting rotation. Furthermore, in a case where the camera is viewed from the upper side, the clockwise rotation is assumed as the positive direction of panning rotation. Incidentally, a shift or a deviation of the measuring position due to an image distortion or the like is ignored.

Further, to maintain visibility in case of displaying a face, a figure or a character (or a text), it is necessary to maintain certain resolution and a certain physical size. It should be noted that the certain resolution is determined based on the resolution of the face, the figure or the character and the certain physical size is determined based on the displaying size of the face, the figure or the character in real circumstances. Here, the certain resolution is called a logical displaying size and the certain physical size is called a physical displaying size. The reception apparatus 200 calculates the logical displaying size, and such a process corresponds to an example of the operation of a logical displaying size calculation unit. Further, the reception apparatus 200 calculates the physical displaying size, and such a process corresponds to an example of the operation of a physical displaying size calculation unit. In addition, the reception apparatus 200 sets the lower limit value of each size, and such a process corresponds to an example of the operation of a lower limit setting unit.

Figure 5:
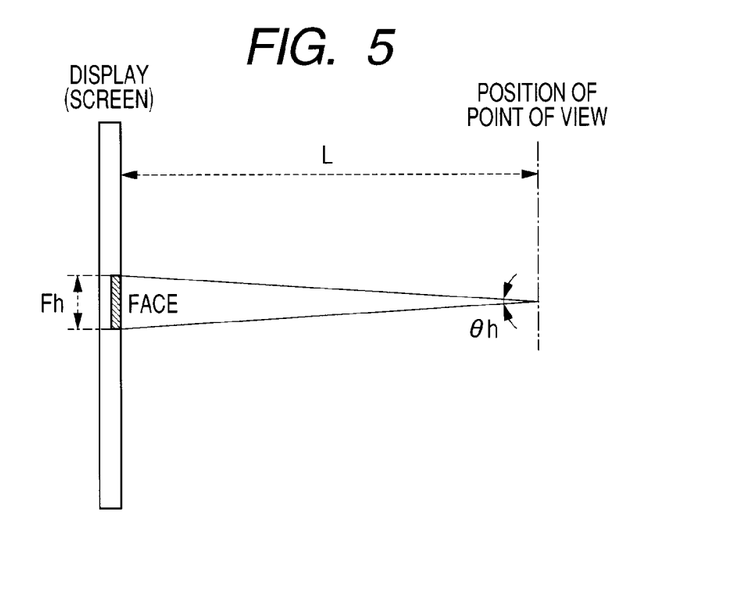
FIG. 5 is a diagram for describing physical displaying sizes of the persons and the texts.

For example, with respect to the face, the numbers of vertical and horizontal pixels (Fh, Fv) are selected as the logical displaying size, and angles (θh, θv) by which the face is viewed from a typical point of view are selected as the physical displaying size. Here, the relation between the point of view and the size of the displaying area will be described with reference to FIG. 5. That is, FIG. 5 is the diagram illustrating the actual arrangement in the state that the user is viewing the display from the horizontal direction. In this case, the typical point of view can be acquired from the position of a seat in a conference room where the terminal has been installed. If it is assumed that the distance between the point of view and the display (i.e., a screen) is L and the numbers of the displaying pixels for each unit length of the display are (Rh, Rv) pixels/m, then the approximate values of the angles (θh, θv) by which the face is viewed from the typical point of view are calculated by the following equations (equation 2).

$$\theta h = 2 \tan^{-1}(Fh/Rh/2L)$$

$$\theta v = 2 \tan^{-1}(Fv/Rv/2L)$$

For this reason, in a case where the person image is arranged, it is necessary to set and control a reduction magnification or a zooming magnification so that the angles by which the face is viewed from the typical point of view does not fall below the lower limit values of the angles (θh, θv). In other words, in case of calculating the logical displaying size and the physical displaying size, the reception apparatus 200 determines the display layout so that each of these sizes comes to be equal to or higher than the lower limit.

It should be noted that the above-described theory is also applicable to the character font in the document. That is, the physical displaying size is determined to maintain visibility of each character. Even in case of the character, the physical displaying size can be calculated from the font size as well as the face. For this reason, the logical displaying size and the physical displaying size which are minimally necessary to display the overall document can be calculated. By doing so, the displaying size of the document image can be determined within the range where the visibility is not ruined.

Incidentally, for example, in a case where a desired physical displaying size of the document image cannot be secured, the reception apparatus 200 displays the person image as giving priority to the physical displaying size of the person image. That is, the reception apparatus 200 determines the display layout so that the physical displaying size of the person image is given priority. In this case, the reception apparatus 200 may display a part of the document by performing at least one of the enlargement process, the reduction process and the vertical and horizontal scrolling process to the document image, while maintaining the displaying area as it is. At this time, the reception apparatus 200 displays the document image in the logical displaying size and the physical displaying size each of which has been set to be equal to or higher than the lower limit. Here, it should be noted that the vertical and horizontal scrolling process is the process of scrolling and then displaying the content of the document image so that a part of the content of the document image incapable of being fully displayed in a predetermined content displaying area is displayed. In this case, the content may be scrolled automatically or scrolled according to a user's input operation using a scroll bar or the like. That is, the user may scroll the content of the document image by what method.

Further, in a case where the video is delivered through a network, it is necessary to consider image quality at the time of encoding. For example, if the video data is encoded in a JPEG form, the image quality highly changes according to the setting of a Q value (Quality Number). For this reason, to secure the visibility at a predetermined level, for example, the minimum value of the Q value in the JPEG form is set. In other words, it is necessary to perform the setting of at least one of the encoding image quality and the band at the time of encoding. This is performed by transmitting setting request information for requesting the setting from the reception apparatus 200 to the transmission apparatus 100, and such a process corresponds to an example of the operation of a setting request information transmitting unit. In the transmission apparatus 100, for example, the video encoding unit 112 performs the setting of the encoding image quality or the band at the time of encoding in response to the setting request information, whereby the setting can be achieved. Such a process corresponds to an example of the operation of a setting unit.

Subsequently, the operation processes of the transmission apparatus 100 and the reception apparatus 200 in a case where the above-described method is applied to the video conference will be described with reference to a sequence diagram illustrated in FIG. 6.

Figure 6:
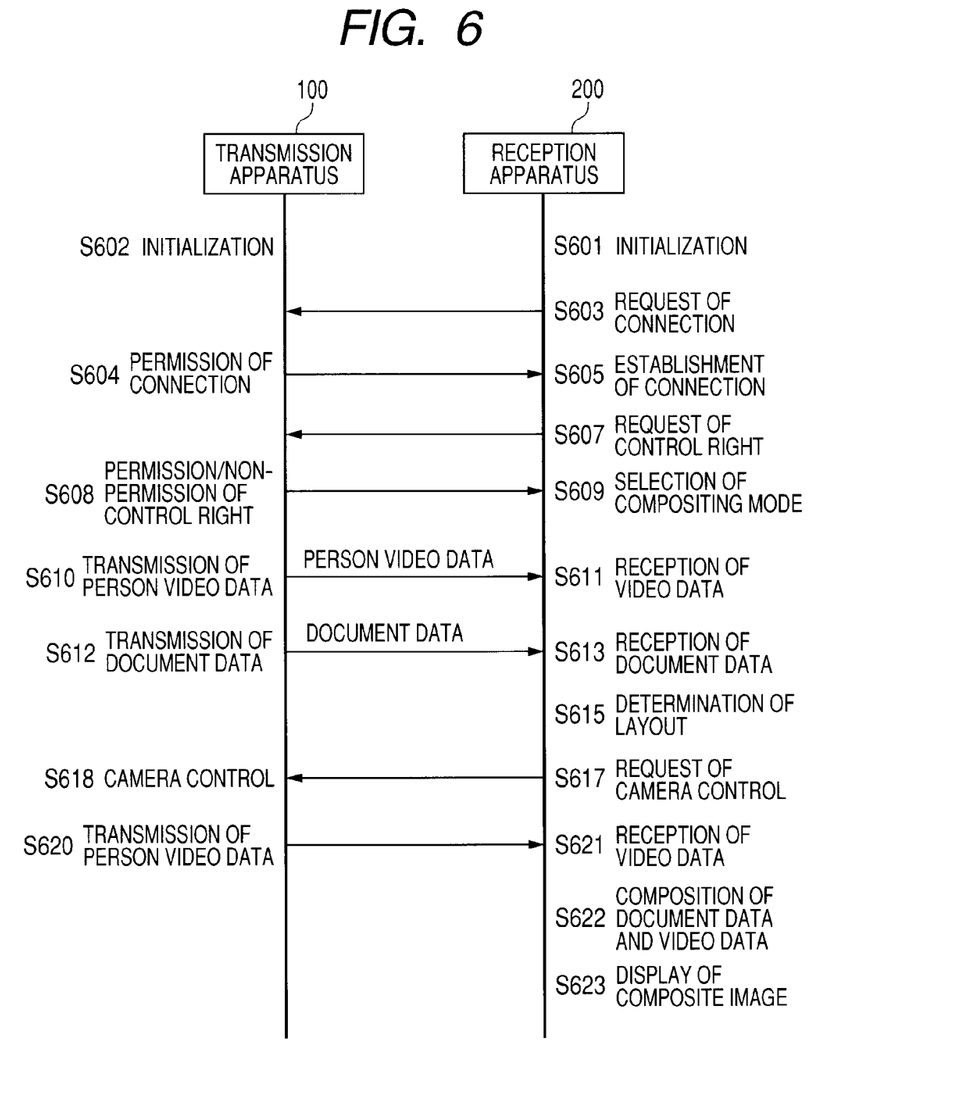
FIG. 6 is a diagram illustrating an operation sequence between the transmission apparatus and the reception apparatus.

That is, FIG. 6 is the diagram illustrating the operation sequence between the transmission apparatus 100 and the reception apparatus 200. Here, it should be noted that an ordinary conference terminal has both the function of the transmission apparatus 100 and the function of the reception apparatus 200. For this reason, it is conceivable that the transmission apparatus 100 and the reception apparatus 200 are used pairwise.

In the first instance, in a step S601, the reception apparatus 200 performs an initialization process to the own apparatus. Further, in a step S602, the transmission apparatus performs an initialization process to itself.

Subsequently, in a step S603, the reception apparatus 200 transmits a request of connection to the transmission apparatus 100.

In a step S604, the transmission apparatus 100 returns to the reception apparatus 200 a signal indicating permission of connection. By such a process, the connection between the transmission apparatus 100 and the reception apparatus 200 is established in a step S605. Incidentally, in the present embodiment, an H.323 protocol or an SIP (Session Initiation Protocol) is used to control the connection between the transmission apparatus 100 and the reception apparatus 200. However, the present invention is not limited to such a specific connection control protocol. Further, in the present embodiment, the reception apparatus 200 transmits the request of connection to the transmission apparatus 100 for convenience of explanation. However, in fact, there is no distinction between the transmission and the reception up to the establishment of the connection. Therefore, a control portion other than the reception apparatus 200 may perform the connection process.

Subsequently, in a step S607, the reception apparatus 200 requests the control right of the camera 10 to the transmission apparatus 100.

Subsequently, in a step S608, the transmission apparatus 100 returns to the reception apparatus 200 a signal indicating whether or not to permit the camera control.

Subsequently, in a step S609, the reception apparatus 200 receives the relevant signal and discriminates the content thereof. Such a process corresponds to an example of the operation of an acquisition judging unit.

Subsequently, the reception apparatus 200 selects a screen compositing mode (or a screen selection mode) on the basis of the judged result in the step S609. As described in FIGS. 3 and 4, the screen selection mode is the mode of selecting, in case of changing the arrangement of the person area, whether to arrange the person area according to the image process or to arrange the person area according to the camera control. Here, if the reception apparatus 200 receives the signal indicating the permission of the camera control from the transmission apparatus 100, that is, if the reception apparatus 200 acquires the camera control right, the reception apparatus 200 selects the mode of arranging the person area according to the camera control. On the other hand, if the reception apparatus 200 receives the signal indicating the non-permission of the camera control from the transmission apparatus 100, the reception apparatus 200 selects the mode of arranging the person area by electronically changing it.

Subsequently, in a step S610, the transmission apparatus 100 transmits the video data indicating the person to the reception apparatus 200. Further, in a step S611, the reception apparatus 200 receives the video data indicating the person from the transmission apparatus 100.

Further, in a step S612, the transmission apparatus 100 transmits the document (text) data to the reception apparatus 200. Furthermore, in a step S613, the reception apparatus 200 receives the document data. Incidentally, although it is not illustrated, the reception apparatus 200 continuously receives the video data indicating the person.

In a step S615, the reception apparatus 200 performs a person detecting process. Further, the reception apparatus 200 determines the display layout so that the person area as illustrated in FIG. 4 and another content area do not overlap. More specifically, for example, the reception apparatus 200 determines the display layout as separating the person area and the content area by a predetermined distance. Such a process corresponds to an example of the operation of a display layout determining unit. At this time, the reception apparatus 200 determines the display layout on the basis of the logical displaying size and the physical displaying size which have been calculated in the manner as described above.

Subsequently, in a step S617, the reception apparatus 200 transmits a request of camera control to the transmission apparatus 100. Incidentally, if the reception apparatus 200 does not have the camera control right, the person area is arranged according to the image process as described above.

Then, in a step S618, the transmission apparatus 100 controls the panning, the tilting and the zooming of the camera 10 on the basis of the request of the camera control transmitted from the reception apparatus 200.

After the camera operation was performed, in a step S620, the transmission apparatus 100 transmits the video data indicating the person to the reception apparatus 200. Then, in a step S621, the reception apparatus 200 receives the video data indicating the person from the transmission apparatus 100.

In a step S622, the reception apparatus 200 composites the document data and the video data indicating the person on the basis of the determined display layout.

In a step S623, the reception apparatus 200 displays the composite video on the display 30. Such a process corresponds to an example of the operation of a display processing unit.

Figure 7:
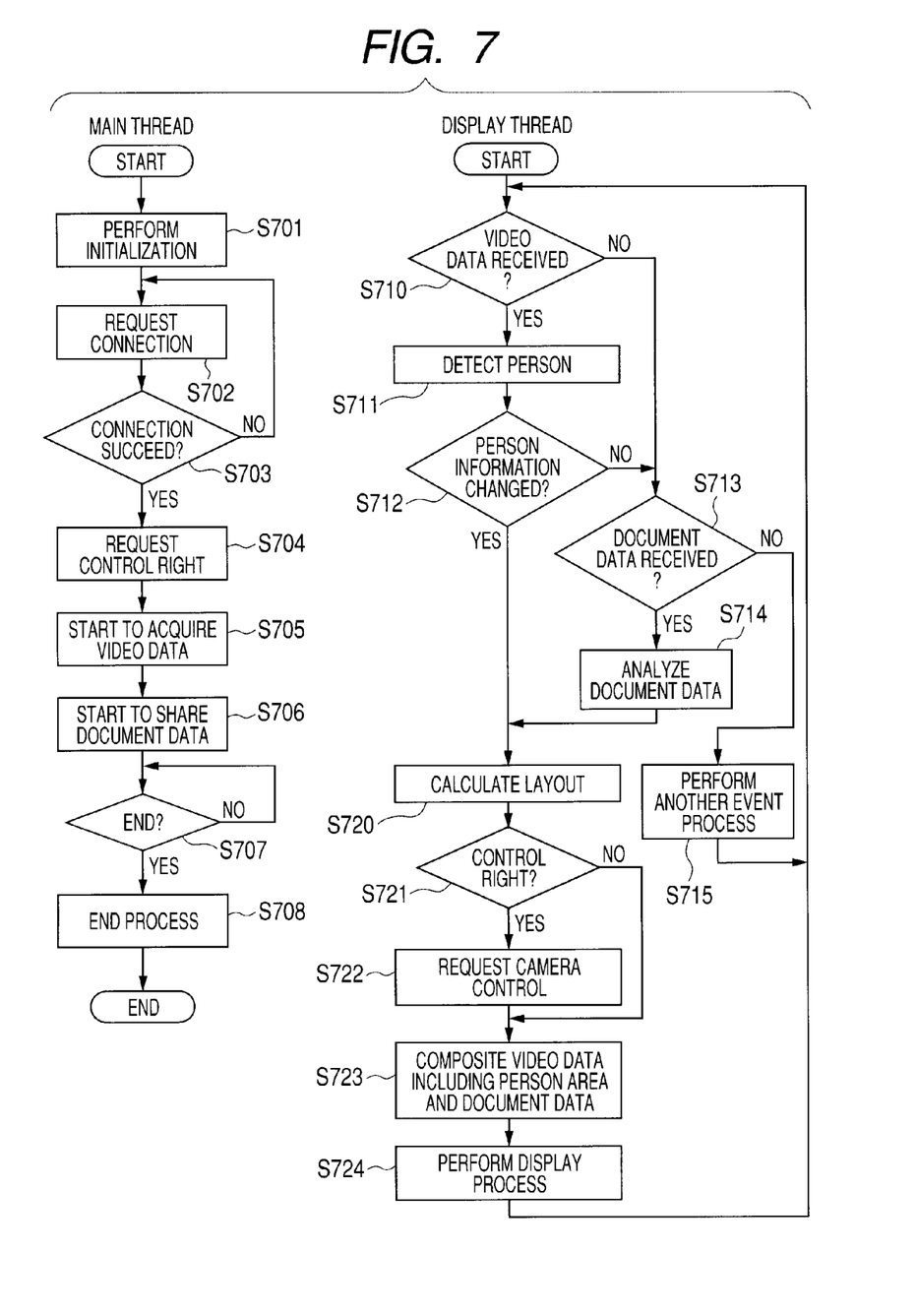
FIG. 7 is a flow chart indicating an operation process of the reception apparatus.

Subsequently, the operation process of the reception apparatus 200 will be described with reference to a flow chart illustrated in FIG. 7. Here, it should be noted that the flow chart illustrated in FIG. 7 is achieved, for example, if the CPU provided in the reception apparatus 200 executes the program stored in the external storage apparatus 261 of the reception apparatus 200. Incidentally, the program is composed of plural execution units which operate simultaneously and parallelly. In the present embodiment, the description is limited to the operation procedures of a main thread and a display thread as the parts concerning the present invention.

First of all, in the main thread, in a step S701, the reception apparatus 200 performs an initialization process to itself.

Next, in a step S702, the reception apparatus 200 transmits the request of connection to the terminal of a communication partner, that is, the transmission apparatus 100.

Next, in a step S703, the reception apparatus 200 judges whether or not the connection succeeds. That is, if it is judged by the reception apparatus 200 that the connection succeeds, then the flow advances to a step S704. On the other hand, if it is judged by the reception apparatus 200 that the connection does not succeed, then the flow returns to the step S702. In the step S702, the reception apparatus 200 again transmits the request of connection to the transmission apparatus 100.

In the step S704, the reception apparatus 200 requests the control right of the camera 10 to the transmission apparatus 100. Incidentally, if the transmission apparatus 100 and the camera 10 have been constituted integrally, the reception apparatus 200 requests the control right to the camera 10 directly. At this time, according to whether or not the control right can be acquired, the later-described process of the display thread is partially different.

Next, in a step S705, the reception apparatus 200 starts to acquire the video data from the terminal of the communication partner, that is, the transmission apparatus 100.

Further, in a step S706, the reception apparatus 200 starts to perform a process of sharing the document data. This process is to instruct the terminal of the communication partner to perform the process of sharing the specific document data. Here, it should be noted that, in this case, as the apparatus in which the actual data of the document has been stored, it is possible to use both the reception apparatus 200 which is the own terminal and the transmission apparatus 100 which is the terminal of the communication partner. In any case, in a case where the process of sharing the document data is started, mutual communication is performed between the reception apparatus 200 and the transmission apparatus 100 if document data is added and/or updated.

Next, in a step S707, the reception apparatus 200 judges whether or not the process of sharing the document data ends. If it is judged that the process of sharing the document data ends, the flow advances to a step S708. On the other hand, if it is judged that the process of sharing the document data does not end, the reception apparatus 200 is on standby until the process ends.

In the step S708, the reception apparatus 200 ends the process of the main thread.

Subsequently, the display thread in which the document area, i.e., the content area of the document, and the person area are composited and displayed will be described hereinafter.

First of all, in a step S710, the reception apparatus 200 judges whether or not the video data is received. Then, if it is judged that the video data is received, the flow advances to a step S711. On the other hand, if it is judged that the video data is not received, the flow advances to a step S713.

In the step S711, the reception apparatus 200 detects the person in the video indicated by the received video data. Here, it should be noted that the reception apparatus 200 detects the single person or the plural persons on the basis of the face or the upper body of the person or the faces or the upper bodies of the persons included in the video indicated by the received video data. Such a process corresponds to an example of the operation of a person detecting unit.

Next, in a step S712, the reception apparatus 200 analyzes a result of the person detecting process to judge whether or not person information changes. Then, if it is judged that the person information changes, the flow advances to a step S720.

In the step S720, the reception apparatus 200 identifies the person area on the basis of the person information, and thus calculates the display layout. On the other hand, if it is judged in the step S712 that the person information does not change, the flow advances to the step S713.

Then, in the step S713, the reception apparatus 200 judges whether or not the document data is received. Here, if it is judged that the document data is received, the flow advances to a step S714.

In the step S714, the reception apparatus 200 analyzes the received document data to detect the font size, the use area and the like of the document.

After the reception apparatus 200 analyzed the document data, the flow advances to the step S720. In the step S720, the reception apparatus 200 calculates the display layout on the basis of the person area and the document area. As just described, if at least one of the person area and the document area changes, the reception apparatus 200 recalculates the display layout.

Subsequently, in a step S721, the reception apparatus 200 judges whether or not the camera control right has been acquired. If it is judged that the camera control right has been acquired, the flow advances to a step S722. In the step S722, the reception apparatus 200 transmits the request of camera control to the transmission apparatus 100 on the basis of the display layout calculated in the step S720. That is, based on the camera control, the transmission apparatus 100 causes the camera 10 to perform the panning operation, the tilting operation and the zooming operation so as to change the person area in the video. Thus, the changed person area is rearranged in the displaying area.

On the other hand, if it is judged in the step S721 that the camera control right is not acquired, the reception apparatus 200 rearranges the person area based on the image process, and the flow advances to a step S723.

In the step S723, the reception apparatus 200 composites the video including the rearranged video area and the document.

Subsequently, in a step S724, the reception apparatus 200 displays the composite video and document on the display 30. After the reception apparatus 200 displayed the composite video and document on the display 30, the flow returns to the step S710 to perform a next event process. Incidentally, if it is judged in the step S713 that the reception apparatus 200 does not receive the document data, the flow advances to a step S715. In the step S715, the reception apparatus 200 performs another event process.

As just described, according to the present embodiment, the reception apparatus 200 moves the person to the corner of the displaying area of the display 30 with the relevant person maintained to a specific size, composites another content such as the document content or the like to the background area in the displaying area, and then displays the acquired composite contents. Therefore, it is possible to improve the visibility when the user views the plural contents such as the video content including the person, the document content and the like.

Further, the reception apparatus 200 determines the display layout so that the person area and another content area such as the document content area or the like do not overlap. In other words, for example, the reception apparatus 200 determines the display layout as separating the person area and the content area by the predetermined distance. For this reason, it is possible to effectively use the display screen provided on the display.

In addition, the lower limit of the physical displaying size of the person is set, and it is controlled not to perform the image process and/or the camera control at the level lower than the lower limit. For this reason, it is possible to improve the visibility when the person is displayed on the display.

Second Embodiment

In the following, the second embodiment of the present invention will be described. In the second embodiment, the person area is observed for a certain time to produce an observed value. Then, the content area to which another content such as a document content or the like is arranged is calculated on the basis of the acquired observed value. More specifically, a process of calculating a margin between the person area and another content area is newly added in the present embodiment.

Then, a method of arranging the margin will be described with reference to FIG. 3.

In FIG. 3, the reception apparatus 200 detects the two face areas 311 and 312 in the video. Further, in FIG. 3, although the persons in the video are sitting, they are not at rest completely. Thus, the position of the face of each person finely changes on the screen at all times. For this reason, when the document area or the like is arranged, if the document area and the person area are made too close to each other, various problems described below occur. That is, the person image goes outside the person area. Besides, the person image conceals the document area. In the present embodiment, in order to solve these problems, the appropriate margin is arranged between the person area and another content area.

In the present embodiment, the person area is not determined merely from the single video. That is, in the present embodiment, face detection is performed for the certain time, and then the area in which probability of becoming the face area on the screen is equal to or higher than a certain value is determined as the person area. Hereinafter, such a method of identifying the person area will be described concretely.

First, in a case where the reception apparatus 200 acquires the face area in the form of a rectangular area as a result of the face detection, the area of the surrounding predetermined pixels of the relevant rectangle is set as the measured area (i.e., a candidate area). Incidentally, it should be noted that it is possible to detect plural faces. In such a case, for example, an arbitrary area which includes the plural detected faces is set, and the area of the surrounding predetermined pixels of the arbitrary area is set as the measured area. Such a process corresponds to an example of the operation of a candidate area setting unit.

Subsequently, the reception apparatus 200 detects the face within the measured area for a certain time T. Here, in the acquired frame, the number of times of detecting the face is added by 1 (frame) with respect to each of the image elements (pixels) constituting the candidate area. Here, if it is assumed that the number of frames which are being measured is N, the reception apparatus 200 can acquire a statistic of the number of times of detecting the face during a period from 0 to N. Such a process corresponds to an example of the operation of a measuring unit.

Then, the reception apparatus 200 identifies the area of the pixel to which the number of detection times is equal to or hither than a predetermined value Th, on the basis of the measured result. Incidentally, it should be noted that the predetermined value Th can be calculated based on the number of frames, i.e., Th=r×N. Here, the symbol r indicates a detection rate. For example, if 90% or more is set as a certain rate or more, 0.9 is used as the detection rate. Incidentally, as the unit by which a voting is performed, it is possible to use, in addition to the pixel, an encoding block unit such as a JPEG encoding block unit or an area having an arbitrary shape.

As a result, the reception apparatus 200 can calculate an area which is acquired as of the aggregation of the pixels detected as the face at a probability equal to or higher than the detection rate r. In any case, since the area which has been calculated as described above ordinarily includes projections and holes, a smoothing process is performed thereto by performing a dilation and erosion process with use of a morphological operator. Besides, there is a case where plural areas can be acquired. In this case, an area which contains the plural acquired areas is judged or discriminated, and a certain margin D1 is set outside the judged area. Such a process corresponds to an example of the operation of an area judging unit. After that, the reception apparatus 200 identifies, as the conclusive person area, the area to which the certain margin has been set.

In any case, if the reception apparatus 200 once determines the person area, the arrangement process of the determined person area is performed by the image process and/or the camera control as described in the first embodiment. As a result, it is possible to determine the display layout which includes other contents such as the document area and the like.

Subsequently, an operation process which is to be performed in a case where the above-described process is applied to the video displaying system will be described with reference to a flow chart illustrated in FIG. 8.

Figure 8:
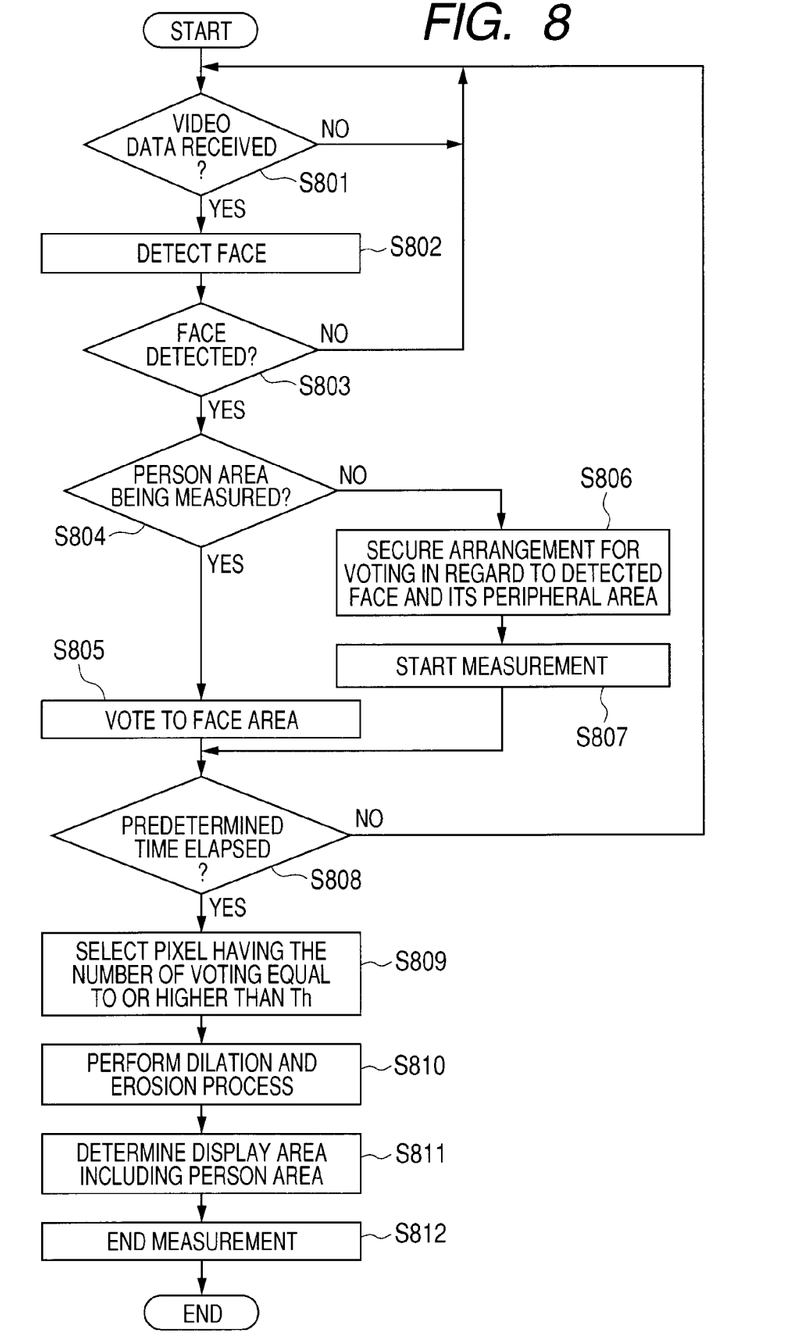
FIG. 8 is a flow chart indicating an operation process for calculating the person area.

Here, it should be noted that the flow chart illustrated in FIG. 8 indicates the process which is to be inserted after the process of the step S712 in the flow chart of the display thread illustrated in FIG. 7.

Further, the operation process illustrated in the flow chart of FIG. 8 takes a time of few seconds. For this reason, it is reasonable to perform the operation process in FIG. 8 only in a case where the person greatly moves.

At the beginning, in a step S801, the reception apparatus 200 judges whether or not the video data is received. Then, if it is judged that the video data is received, the flow advances to a step S802.

In the step S802, the reception apparatus 200 performs the face detection process.

Next, in a step S803, the reception apparatus 200 judges whether or not the face is detected. Here, if it is judged that the face is not detected, the flow returns to the step S801 to receive next video data. On the other hand, if it is judged in the step S803 that the face is detected, the flow advances to a step S804.

In the step S804, the reception apparatus 200 judges whether or not the person area is being measured. Here, if it is judged that the person area is not being measured, the flow advances to a step S806 to newly start to measure the person area. In the step S806, the reception apparatus 200 secures the arrangement for the voting in regard to the pixels corresponding to the detected face and its peripheral area.

Next, in a step S807, the reception apparatus 200 starts to measure the face area for a predetermined time.

On the other hand, if it is judged in the step S804 that the person area is being measured, the flow advances to a step S805. In the step S805, the reception apparatus 200 performs the voting to the pixel. In other words, as described above, the reception apparatus 200 adds together the number of times of detecting the face with respect to each pixel.

In a step S808, the reception apparatus 200 judges whether or not a predetermined time is elapsed. Alternatively, the reception apparatus 200 judges whether or not predetermined frames are measured. In any case, if it is judged that further measuring is necessary, the flow returns to the step S801.

On the other hand, if it is judged that the predetermined time is elapsed or the sufficient measured data can be acquired, the flow advances to a step S809.

In the step S809, the reception apparatus 200 selects the pixel to which the number of voting is equal to or higher than a predetermined number. That is, the reception apparatus 200 identifies the pixel to which the number of times of detecting is equal to or higher than the predetermined value Th.

Subsequently, in a step S810, the reception apparatus 200 performs the dilation and erosion process to the aggregation of the selected pixels by using the morphological operator.

Subsequently, in a step S811, the reception apparatus 200 determines, as the person area, the result of the process in the step S810 to which the certain margin has been added.

After then, in a step S812, the reception apparatus 200 ends the measuring process.

As just described, according to the present embodiment, the area of the aggregation of the pixels detected as the face at the certain probability or more is detected, and the person area is determined on the basis of the detected area. Thus, it is possible to determine the person area in consideration of the case where the person finely moves. For this reason, it is possible to prevent that the person area overlaps other content areas due to the movement of the person.

Incidentally, in the present embodiment, only the method of detecting the face has been described as the method of detecting the person. However, it should be noted that, in the present invention, the method of detecting the person is not limited to such a face detecting method. That is, for example, it is possible to detect the person by using a method of detecting the upper body of the person.

Third Embodiment

In the following, the third embodiment of the present invention will be described. In the third embodiment, the person detecting is performed on the transmission side. In this case, after a video was acquired from the camera 10, the transmission apparatus 100 identifies a person area. Subsequently, the transmission apparatus 100 transmits, to the reception apparatus 200, the data indicating the identified person area together with the data indicating the acquired video.

Incidentally, in response to a request transmitted from the reception apparatus 200, the transmission apparatus 100 may transmit the identified result of the person area to the reception apparatus 200. Here, it should be noted that the identified result is the data indicating the person area which includes, for example, the number of faces, the position and the size of each face, and the like. Further, for example, if the reception apparatus 200 transmits the request in the HTTP (HyperText Transport Protocol) form to the transmission apparatus 100, the transmission apparatus 100 returns the response to the reception apparatus 200. Alternatively, the transmission apparatus 100 may add the data indicating the person area to the video data, and then transmit the acquired video data to the reception apparatus 200. As just described, according to the present embodiment, since the person area is identified on the side of the transmission apparatus 100, it is possible to reduce a load on the side of the reception apparatus 200.

Fourth Embodiment

In the following, the fourth embodiment of the present invention will be described with reference to FIG. 9. In the fourth embodiment, the person detected by the person detection process is identified, and the identification information indicating the identified person is displayed on a display.

For example, the reception apparatus 200 performs a process of identifying the detected face, after the process in the step S802 of the flow chart illustrated in FIG. 8. More specifically, the reception apparatus 200 extracts the feature data from the detected face. Then, the reception apparatus 200 detects, in the extracted feature data, the coincident feature data from among the plural feature data stored in the external storage apparatus 261 or the like. Such a process corresponds to an example of the operation of a searching unit. After then, the reception apparatus 200 acquires the identification information of the person being associated with the coincident feature data. Such a process corresponds to an example of the operation of an identification information acquisition unit. Incidentally, it should be noted that the identification information includes annexed information of the person of the detected face, such as name information, address information and the like of the relevant person.

Figure 9:
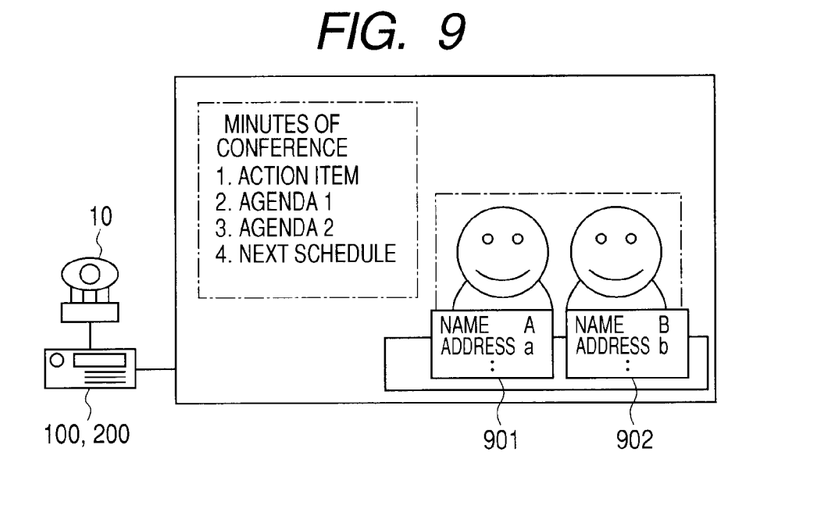
FIG. 9 is a diagram illustrating an example of a screen on which, as well as the persons, identification information for identifying these persons is displayed.

After then, at the time when the reception apparatus 200 displays the composite video and document on the display 30 in the step S724 of the flow chart of the display thread illustrated in FIG. 7, the reception apparatus 200 displays identification information 901 and identification information 902 which have been acquired, so that each identification information is close to the corresponding person included in the video as illustrated in FIG. 9. As just described, according to the present embodiment, since the identification information which is relative to the person included in the video is displayed, the user who watches the display 30 can immediately and directly identify and discriminate the person who is being displayed on the display. As a result, it is possible to smoothly advance the video conference which is executed between the transmission apparatus 100 and the reception apparatus 200.

Incidentally, in the present embodiment, the reception apparatus 200 acquires the identification information. However, the present invention is not limited to such a case. For example, the transmission apparatus 100 may acquire the identification information by detecting the face, extracting the feature data from the detected face, and identifying the face of the person based on the extracted feature data. In this case, the transmission apparatus 100 transmits, to the reception apparatus 200, the acquired identification information of the person together with the video data.

Moreover, the reception apparatus 200 may cut out the person area from the video data and the data indicating the identified person area which have been transmitted from the transmission apparatus 100 as indicated in the third embodiment, identify the face of the person from the cut-out person area, and acquire the identification information based on the identified face.

Fifth Embodiment

In the following, the fifth embodiment of the present invention will be described. In the fifth embodiment, a case where the present invention is used in a system other than the video and audio communication system such as the video conference system in which data can be transmitted bi-directionally between two parties will be described. More specifically, in the present embodiment, a case where the present invention is used in a simplex video and audio communication system such as an individual broadcasting system, a monitoring system or the like will be described.

Here, it should be noted that the system according to the present embodiment is constituted by including, from among the constituent elements illustrated in FIGS. 1 and 2, the camera 10, the transmission apparatus 100, the network, the reception apparatus 200 and the display 30. Mores specifically, in a case where the system is the individual broadcasting system, the transmission apparatus 100 delivers, to many and unspecified receivers, the videos together with the contents such as the document and the like which are all intended to be shared on the display. In this case, there are a large number of reception apparatuses 200, and each of the reception apparatuses 200 displays the plural contents such as the video, the document and the like in desired sizes in accordance with given environments.

On the other hand, in a case where the system of the present embodiment is the monitoring system, there are a large number of transmission apparatuses 100. Further, in this system, if a suspicious person is detected in the displayed video, the reception apparatus 200 displays the information concerning the detected person on the screen. In such a case, if the person area is rearranged to newly produce the background area, it is possible to sufficiently display the detailed information concerning the detected person. In any case, the information to be displayed in this case may be stored in the transmission apparatus 100. However, in ordinary practice, the reception apparatus 200 acquires the relevant information from an external database or stores the relevant information in the external storage apparatus 261 of the reception apparatus 200. Moreover, as well as the first embodiment, the camera 10 and the transmission apparatus 100 can be constituted integrally. In this connection, a network camera is enumerated as a typical example.

Sixth Embodiment

In the following, the sixth embodiment of the present invention will be described. In the sixth embodiment, a method of determining the display layout in which the content area is arranged so that the content area does not overlap the person area will be described with reference to FIGS. 10A and 10B.

Figure 10A:
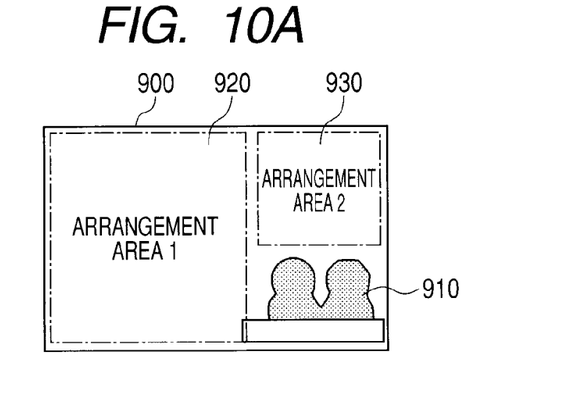
FIGS. 10A and 10B are diagrams for describing a method of determining a display layout of arranging the content areas.

Initially, as illustrated in FIG. 10A, the reception apparatus 200 detects the persons from the original video image, determines the size of the person area so that the physical displaying size of the person area comes to have the lower limit by which the expressions of the faces of the persons can be recognized, and then arranges an acquired person area 910 at the lower right corner of a displaying range 900. In the present embodiment, an example of the case where the border of the persons in the person area is judged by detecting the upper bodies of these persons is described.

Subsequently, the reception apparatus 200 sets the content area of another content to a free area which does not overlap the person area. Here, as a method of setting the content area, there is a method of setting the content area as giving priority to the vertical direction. In case of giving priority to the vertical direction, as indicated in FIG. 10A, a first arrangement area 1 (920) is set in portrait. Incidentally, as described in the second embodiment, the reception apparatus 200 sets a certain margin at the border between the person area 910 and the first arrangement area 1 (920). Then, if the first arrangement area 1 (920) is determined as described above, it is possible to set a second arrangement area 2 (930) in a remaining free area. After this manner, it is possible to recursively set the plural content areas. That is, it is possible to determine the display layout. Incidentally, it should be noted that a criterion such as a minimum square measure or the like has been previously set in regard to the arrangement area. For this reason, if it is impossible to newly secure the arrangement area which has a certain square measure or more, the reception apparatus 200 ends the process of setting the arrangement area.

Figure 10B:
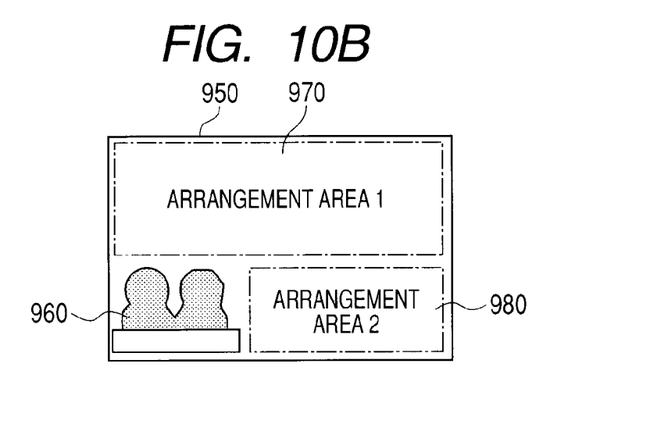

On the other hand, as the method of setting the content area, there is a method of setting the content area as giving priority to the horizontal direction. In case of giving priority to the horizontal direction, as indicated in FIG. 10B, a first arrangement area 1 (970) is set in landscape. Further, as indicated in FIG. 10B, it is possible to arrange a person area 960 at the lower left corner of a displaying range 950. In the same manner as described above, the reception apparatus 200 sets a certain margin at the border between the person area 960 and the first arrangement area 1 (970). Likewise, it is possible to set a second arrangement area 2 (980) in a remaining free area.

Incidentally, in the present embodiment, the arrangement area is rectangular. However, the present invention is not limited to this. That is, even if the arrangement area has an arbitrary shape, it is possible by the same manner to set the content area so that the content area does not overlap the person area.

Further, in the present embodiment, the content areas are set in sequence. However, the present invention is not limited to this. That is, it is possible to secure the plural content areas having the same attribute in a lump. For example, it is possible to set the plural content areas by previously determining the number of content areas intended to be arranged and actually arranging the rectangular areas having the same shape. Likewise, it is possible to set, to the displaying area, the desired number of content areas having the same square measure and the arbitrary shape.

Further, in the present embodiment, the number of person area is only one. However, the present invention is not limited to this. That is, it is possible to identify plural person areas. In this case, the arrangement of the plural person areas is first determined, and then the content area is set so that the content area does not overlap the plural person areas. Further, in this operation, it is possible to use the plural person areas which have been identified from plural videos. Alternatively, it is possible to individually arrange the person area with respect to each person. In both cases, it is necessary to set the arrangement so that the plural person areas do not overlap.

Other Embodiments

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or the apparatus, and the recording medium where the program is stored, are included as being within the scope of the present invention.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-255575, filed Sep. 30, 2008, which is hereby incorporated by reference herein in its entirety.

What is claimed is:

1. A video displaying apparatus which displays a video to which information including at least one of a graphic and a text is added, the video playing apparatus comprising:
   an identifying unit configured to identify an object included in a video shot by an imaging device;
   a display layout determining unit configured to determine a display layout of an area of the identified object and an area of information including at least one of the graphic and the text, so that the area of the identified object and the area of the information do not overlap;
   an imaging device control unit configured to control, when a control right of the imaging device is acquired, at least one of a panning operation, a tilting operation, and a zooming operation of the imaging device to change, on the basis of the determined display layout, at least one of a position and a size of the area of the identified object in the video shot by the imaging device; and
   a display processing unit configured to display the information including at least one of the graphic and the text on the video shot by the imaging device controlled by the imaging device control unit so that the changed area of the identified object and the area of the information do not overlap.

2. A video displaying apparatus according to claim 1, further comprising an area changing unit configured to electronically change at least one of a position and a size of the area of the identified object, in regard to a displaying area,
   wherein the display processing unit displays, when a control right of the imaging device is not acquired, the area changed by the area changing unit and the area of the information including at least one of the graphic and the text so that the changed area and the area of the information do not overlap.

3. A video displaying apparatus according to claim 1, further comprising an acquisition judging unit configured to judge whether or not the control right of the imaging device which shoots the video has been acquired,
   wherein a unit which changes, in regard to the displaying area, at least one of the position and the size of the area of the identified object is selected in accordance with a judged result by the acquisition judging unit.

4. A video displaying apparatus according to claim 1, further comprising a person detecting unit configured to detect a face or an upper body of a person included in the video, wherein the identifying unit identifies a person on the basis of the face or the upper body of a person or the faces or the upper bodies of plural persons detected by the person detecting unit.

5. A video displaying apparatus according to claim 1, further comprising:
   a person detecting unit configured to detect a face or an upper body of a person included in the video;
   a searching unit configured to search coincident feature data based on feature data of the face of the person detected by the person detecting unit; and
   an identification information acquisition unit configured to acquire identification information of the person stored in association with the feature data searched by the searching unit,
   wherein the identifying unit identifies a person on the basis of the face or the upper body of a person or the faces or the upper bodies of plural persons detected by the person detecting unit, and
   wherein the display processing unit displays the identification information acquired by the identification information acquisition unit, together with the person included in the video.

6. A video displaying apparatus according to claim 1, further comprising:
   a candidate area setting unit configured to set a candidate area including the area of a predetermined object included in the video; and
   a measuring unit configured to measure a number of detection times of detecting the predetermined object during a certain period with respect to each image element constituting the candidate area set by the candidate area setting unit,
   wherein the identifying unit identifies an area of the predetermined object on the basis of a measured result by the measuring unit.

7. A video displaying apparatus according to claim 1, further comprising:
   a logical displaying size calculation unit configured to calculate a logical displaying size at a time when the identified object included in the video is displayed on the video displaying apparatus;
   a physical displaying size calculation unit configured to calculate a physical displaying size at the time when the identified object is displayed on the video displaying apparatus, on the basis of an actual arrangement of the video displaying apparatus which displays the video and a user; and
   a lower limit setting unit configured to set a lower limit of each of the logical displaying size and the physical displaying size,
   wherein the display processing unit displays the identified object included in the video, at a level equal to or higher than the lower limit set by the lower limit setting unit.

8. A video displaying apparatus according to claim 7, wherein the logical displaying size calculation unit calculates a logical displaying size at a time when the text is displayed on the video displaying apparatus,
   wherein the physical displaying size calculation unit calculates a physical displaying size at the time when the text is displayed on the video displaying apparatus, on the basis of an actual arrangement of the video displaying apparatus which displays the text and the user,
   wherein the lower limit setting unit sets a lower limit of each of the logical displaying size and the physical displaying size of the text, and
   wherein in a case where the physical displaying size at the time when the text is displayed on the video displaying apparatus cannot be acquired, the display processing unit preferentially displays the physical displaying size of the identified object.

9. A video displaying apparatus according to claim 8, wherein the display processing unit displays, by performing at least one of an enlargement process, a reduction process, and a vertical and horizontal scrolling process to the text, a part of the text at the level equal to or higher than the lower limit set by the lower limit setting unit.

10. A video displaying system which includes a transmission apparatus and a reception apparatus,
    wherein the transmission apparatus includes a transmission unit configured to transmit a video to the reception apparatus, and
    wherein the reception apparatus includes:
    (a) an identifying unit configured to identify an object included in a video shot by an imaging device;
    (b) a display layout determining unit configured to determine a display layout of an area of the identified object and an area of information including at least one of a graphic and a text so that the area of the identified object and the area of the information do not overlap;
    (c) an imaging device control unit configured to control, when a control right of the imaging device is acquired, at least one of a panning operation, a tilting operation, and a zooming operation of the imaging device to change, on the basis of the determined display layout, at least one of a position and a size of the area of the identified object in the video shot by the imaging device; and
    (d) a display processing unit configured to display the information including at least one of the graphic and the text on the video shot by the imaging device controlled by the imaging device control unit so that the changed area of the identified object and the area of the information do not overlap.

11. A video displaying method in a video displaying apparatus which displays a video to which information including at least one of a graphic and a text is added, the method comprising:
    an identifying step of identifying an object included in a video shot by an imaging device;
    a display layout determining step of determining a display layout of an area of the identified object and an area of information including at least one of the graphic and the text so that the area of the identified object and the area of the information do not overlap;
    an imaging device control step of controlling, when a control right of the imaging device is acquired, at least one of a panning operation, a tilting operation, and a zooming operation of the imaging device to change, on the basis of the determined display layout, at least one of a position and a size of the area of identified object in the video shot by the imaging device; and
    a display processing step of displaying the information including at least one of the graphic and the text on the video shot by the imaging device controlled at the imaging device control step so that the changed area of the identified object and the area of the information do not overlap.

12. A non-transitory computer-readable recording medium which records thereon a program for causing to display a video to which information including at least one of a graphic and a text is added, wherein the computer-readable recording medium records thereon a program for causing a computer to execute a method comprising:

an identifying step of identifying an object included in a video shot by an imaging device;

a display layout determining step of determining a display layout of an area of the identified object and an area of information including at least one of the graphic and the text so that the area of the identified object and the area of the information do not overlap;

an imaging device control step of controlling, when a control right of the imaging device is acquired, at least one of a panning operation, a tilting operation, and a zooming operation of the imaging device to change, on the basis of the determined display layout, at least one of a position and a size of the area of the identified object in the video shot by the imaging device; and a display processing step of displaying the information including at least one of the graphic and the text on the video shot by the imaging device controlled at the imaging device control step so that the changed area of the identified object and the area of the information do not overlap.

13. A video displaying apparatus according to claim 1, wherein the identifying unit identifies a person included in the video, and wherein the display layout determining unit is configured to determine a display layout of the area of the identified person and the area of information including at least one of the graphic and the text so that the area of the identified person and the area of the information do not overlap.

14. A video displaying system according to claim 10, wherein the identifying unit identifies a person included in the video, and wherein the display layout determining unit is configured to determine a display layout of the area of the identified person and the area of information including at least one of the graphic and the text so that the area of the identified person and the area of the information do not overlap.

15. A video displaying method according to claim 11, wherein the identifying step identifies a person included in the video, and wherein the display layout determining step determines a display layout of the area of the identified person and the area of information including at least one of the graphic and the text so that the area of the identified person and the area of the information do not overlap.

16. A non-transitory computer-readable recording medium according to claim 12, wherein the identifying step identifies a person included in the video, and wherein the display layout determining step determines a display layout of the area of the identified person and the area of information including at least one of the graphic and the text so that the area of the identified person and the area of the information do not overlap.

17. A video displaying apparatus which displays a video to which information including at least one of a graphic and a text is added, the video playing apparatus comprising:

a detecting unit configured to detect a predetermined object in a video;

a measuring unit configured to measure a number of detection times of detecting the predetermined object in the video;

an identifying unit configured to identify an area of the predetermined object on the basis of a measured result by the measuring unit; and a display processing unit configured to display information including at least one of the graphic and the text on an area of the video according to a position of the area identified by the identifying unit so that the area of the predetermined object and the area of the information do not overlap.

18. A video displaying apparatus according to claim 17, further comprising:

a display layout determining unit configured to determine a display layout of an area identified by the identifying unit and an area of the information including at least one of the graphic and the text so that the area identified by the identifying unit and the area of the information do not overlap, wherein the display processing unit displays the predetermined object and the information including at least one of the graphic and the text, on the basis of the display layout determined by the display layout determining unit.

19. A video displaying method in a video displaying apparatus which displays a video to which information including at least one of a graphic and a text is added, the method comprising:

a detecting step of detecting a predetermined object in a video;

a measuring step of measuring a number of detection times of detecting the predetermined object in the video;

an identifying step of identifying an area of the predetermined object on the basis of a measured result of the measuring step; and a display processing step of displaying information including at least one of the graphic and the text on an area of the video according to a position of the area identified at the identifying step so that the area of the predetermined object and the area of the information do not overlap.

20. A non-transitory computer-readable recording medium which records thereon a program for causing to display a video to which information including at least one of a graphic and a text is added, wherein the computer-readable recording medium records thereon a program for causing a computer to execute a method comprising:

a detecting step of detecting a predetermined object in the video;

a measuring step of measuring a number of detection times of detecting the predetermined object in the video;

an identifying step of identifying an area of the predetermined object on the basis of a measured result of the measuring step; and a display processing step of displaying information including at least one of the graphic and the text on an area of the video according to a position of the area identified at the identifying step so that the area of the predetermined object and the area of the information do not overlap.

* * * * *